United States Patent
Yamada et al.

(10) Patent No.: US 8,463,804 B2
(45) Date of Patent: Jun. 11, 2013

(54) FILE PROCESSING APPARATUS OPERATING A FILE BASED ON PREVIOUS EXECUTION HISTORY OF THE FILE

(75) Inventors: Masami Yamada, Osaka (JP); Yoshiyuki Tamai, Itami (JP); Hiroyuki Kawabata, Kawanishi (JP); Hisashi Uchida, Kyoto (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 65 days.

(21) Appl. No.: 11/274,211

(22) Filed: Nov. 16, 2005

(65) Prior Publication Data

US 2007/0038606 A1  Feb. 15, 2007

(30) Foreign Application Priority Data

Aug. 10, 2005  (JP) .................................. 2005-232369

(51) Int. Cl.
*G06F 17/30* (2006.01)

(52) U.S. Cl.
USPC .......................................... 707/758; 358/1.1

(58) Field of Classification Search
None
See application file for complete search history.

(56) References Cited

U.S. PATENT DOCUMENTS

| | | | | |
|---|---|---|---|---|
| 2,889,243 A * | 6/1959 | Underwood et al. | ......... | 514/675 |
| 6,507,716 B2 * | 1/2003 | Nomura et al. | ................. | 399/80 |
| 6,577,907 B1 * | 6/2003 | Czyszczewski et al. | ........ | 700/17 |
| 6,633,893 B2 * | 10/2003 | Yahara et al. | ................. | 707/205 |
| 6,700,648 B2 * | 3/2004 | Jun et al. | ......................... | 355/77 |
| 6,735,335 B1 * | 5/2004 | Liu et al. | ....................... | 382/218 |
| 6,865,571 B2 * | 3/2005 | Inaba et al. | ........................ | 707/5 |
| 6,873,430 B2 * | 3/2005 | Grasso et al. | ................ | 358/1.16 |
| 6,947,182 B1 * | 9/2005 | Kumagai | ...................... | 358/402 |
| 6,952,278 B2 * | 10/2005 | Miyahara et al. | ............ | 358/1.15 |
| 6,992,767 B2 * | 1/2006 | Matsumoto et al. | .......... | 356/401 |
| 7,110,996 B2 * | 9/2006 | Kawamura | ............................ | 1/1 |
| 7,221,885 B2 * | 5/2007 | Sato | ................................ | 399/81 |
| 7,225,401 B2 * | 5/2007 | Purvis | ........................... | 715/230 |
| 7,295,336 B2 * | 11/2007 | Yoshida et al. | .............. | 358/1.15 |
| 7,307,746 B2 * | 12/2007 | Inoue | ........................... | 358/1.15 |
| 7,411,693 B2 * | 8/2008 | Loukipoudis et al. | ....... | 358/1.15 |
| 7,471,574 B2 * | 12/2008 | Park | .......................... | 365/189.05 |
| 7,525,694 B2 * | 4/2009 | Nishida | ......................... | 358/462 |
| 7,675,640 B2 * | 3/2010 | Ishii et al. | .................... | 358/1.15 |

(Continued)

FOREIGN PATENT DOCUMENTS

| JP | 2000-112993 | 4/2000 |
|---|---|---|
| JP | 2000-276484 | 10/2000 |

(Continued)

OTHER PUBLICATIONS

Japanese Search Report mailed on Aug. 26, 2008 directed at counterpart application JP-2005-232369; 5 pages.

(Continued)

*Primary Examiner* — Fred I Ehichioya
*Assistant Examiner* — Michelle Owyang
(74) *Attorney, Agent, or Firm* — Morrison & Foerster LLP (57) ABSTRACT

When a user select a file to be processed from a box present in an image formation apparatus a feature of the selected file is extracted. A feature point recording region is searched and data of a previous execution history of a file having a feature point matching that of the selected file is called and displayed. Therefrom the user selects an operation that the user desires to execute for the selected file.

11 Claims, 11 Drawing Sheets

U.S. PATENT DOCUMENTS

| | | | |
|---|---|---|---|
| 7,852,502 B2 * | 12/2010 | Horiyama et al. | 358/1.15 |
| 7,898,679 B2 * | 3/2011 | Brack et al. | 358/1.15 |
| 2003/0074387 A1 * | 4/2003 | Tanaka | 709/103 |
| 2003/0115326 A1 * | 6/2003 | Verma et al. | 709/225 |
| 2003/0123104 A1 * | 7/2003 | Sasakuma et al. | 358/474 |
| 2004/0068495 A1 * | 4/2004 | Inaba et al. | 707/3 |
| 2004/0117472 A1 * | 6/2004 | Masachika | 709/223 |
| 2004/0130634 A1 * | 7/2004 | Delaney et al. | 348/231.99 |
| 2004/0220926 A1 * | 11/2004 | Lamkin et al. | 707/3 |
| 2005/0069107 A1 * | 3/2005 | Tanaka et al. | 379/93.17 |
| 2005/0144234 A1 * | 6/2005 | Tanaka et al. | 709/205 |
| 2005/0254099 A1 * | 11/2005 | Yoda et al. | 358/403 |

FOREIGN PATENT DOCUMENTS

| | | |
|---|---|---|
| JP | 2001-16470 | 1/2001 |
| JP | 2002-244788 | 8/2002 |
| JP | 2003-127473 | 5/2003 |
| JP | 2003-173245 | 6/2003 |
| JP | 2004-102935 | 4/2004 |
| JP | 2004-295605 | 10/2004 |

OTHER PUBLICATIONS

Japanese Notice of Grounds of Rejection, mailed Dec. 9, 2008, directed to counterpart Japanese Patent Application No. 2005-232369; 6 pages.

Ito, Tetsu. (Feb. 26, 2005). Color Illustration, Encyclopedia of DTP & Print Super Scheme, Works Corporation, 2005 Ed., p. 168; 8 pages.

* cited by examiner

FILE PROCESSING APPARATUS OPERATING A FILE BASED ON PREVIOUS EXECUTION HISTORY OF THE FILE

This application is based on Japanese Patent Application No. 2005-232369 filed with the Japan Patent Office on Aug. 10, 2005, the entire content of which is hereby incorporated by reference.

BACKGROUND OF THE INVENTION

1. Field of the Invention

The present invention relates to file processing apparatuses, file processing methods and file processing programs, and particularly to such apparatuses, methods and programs capable of enhancing user operability.

2. Description of the Related Art

A type of image formation apparatus including multi function peripheral (MFP), copiers, facsimiles, printers and other similar equipment has conventional been known. In connection with technology employed to control such image formation apparatuses Japanese Laid-Open Patent Publication No. 2000-276484 discloses an image search apparatus that extracts from the file of an image obtained with a digital camera or electronically processed by a scanner a feature point of the image and searches for any analogous image files, and displays the retrieved image file(s) in a list.

Furthermore, Japanese Laid-Open Patent Publication No. 2004-295605 discloses equipment previously correlating image data with a destination and obtaining information of the destination from the image data when it is transmitted.

Furthermore, Japanese Laid-Open Patent Publication No. 2000-112993 discloses a document classification apparatus analyzing character and image properties of an electronic document to generate a class which is in turn stored to an existing document hierarchy.

An MFP or a similar image formation apparatus may have a hard disk or a similar large-capacity storage device incorporated therein and in that device a box created for each user may be defined and have a file, data and the like stored therein.

When the user desires to process and operate a file in the box, the user must select an operation job and select the file, and for a process such as file transmission select a destination (or input a destination for the first time) or perform a similar operation.

If the box has an increased number of files, destinations and the like stored therein, however, a large number of options are also provided, resulting in cumbersome operations and hence erroneous operations.

SUMMARY OF THE INVENTION

The present invention has been made to overcome the above disadvantage, and it contemplates a file processing apparatus, method and program capable of enhancing user operability.

To achieve the above object the present invention in one aspect provides a file processing apparatus including: a receiver receiving an input indicative of a file selected to be processed: a searcher and retriever searching for and retrieving an execution history of a file analogous to the selected file; and an executor executing an operation for the selected file in accordance with the execution history.

The present invention in another aspect provides a file processing apparatus including: a receiver receiving an input indicative of a process to be executed for a file; a searcher and retriever searching for and retrieving one of a file having previously experienced the process and a file analogous thereto; and an executor executing the process for the retrieved file.

The present invention allows an execution history of a file analogous to a selected file to be referred to to execute an operation for the selected file and execute a process for a file analogous to a file having previously experienced the process. A file processing apparatus, method and program that can provide enhanced user operability can thus be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter embodiments of the present invention will be described.

First Embodiment

Figure 1:
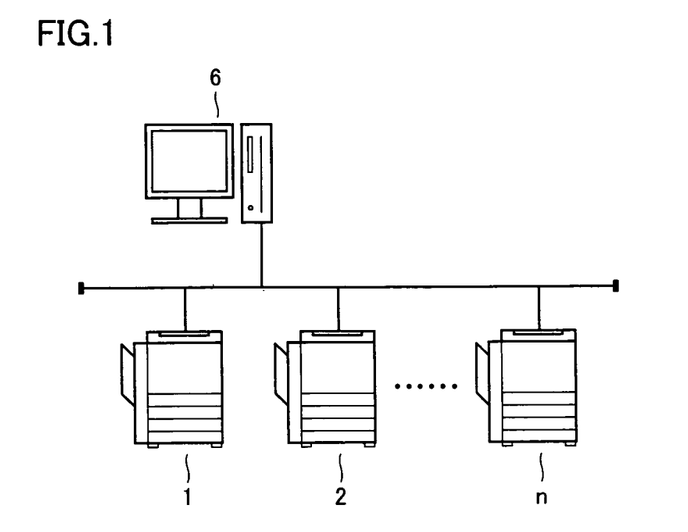
FIG. 1 shows a configuration of an image formation system of the present invention in a first embodiment.

With reference to FIG. 1 an image formation system includes a plurality of image formation apparatuses 1-n and a client PC 6 connected together on a network.

Image formation apparatus 1-n form on a sheet a copy of an image of an original scanned and an image generated from print data transmitted from client PC 6.

Figure 2:
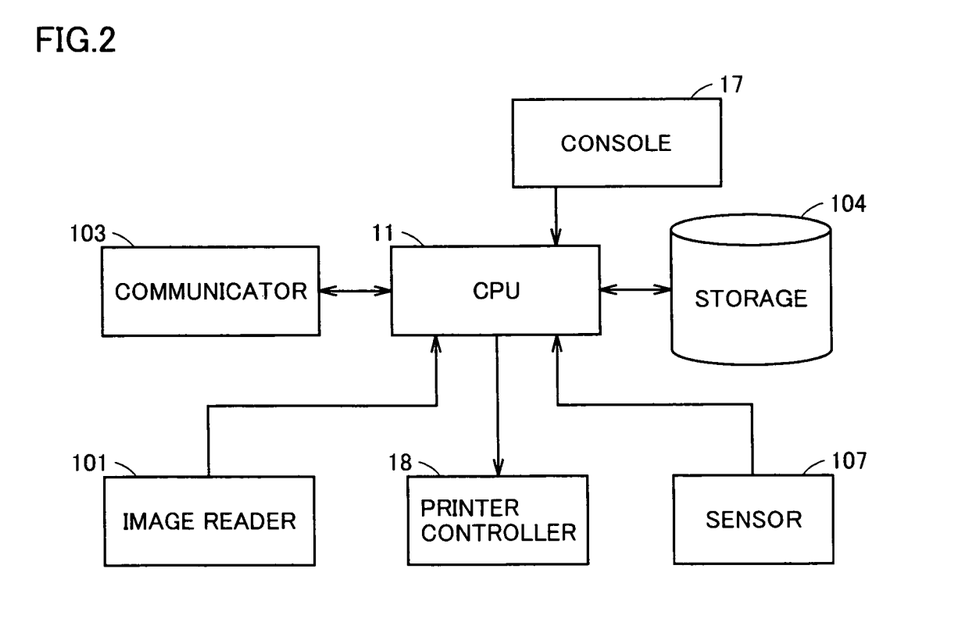
FIG. 2 is a block diagram showing a configuration in hardware of an image formation apparatus 1 of FIG. 1.

FIG. 2 is a block diagram showing a hardware configuration of the FIG. 1 image formation apparatus 1. Image formation apparatuses 2-n have the same configuration as image formation apparatus 1.

With reference to the figure the image formation apparatus includes a CPU 11 generally controlling the apparatus, an image reader 101 reading image data from an original, a printer controller 18 controlling a printer printing an image on a sheet, a communicator 103 operative to perform short-distance radio communications and connect a printing device to a line (a network such as LAN), a storage 104 storing job data, authentication data and the like, a console 17 serving as an interface with a user, and a sensor 107 for example detecting an amount of a consumable available.

Figure 3:
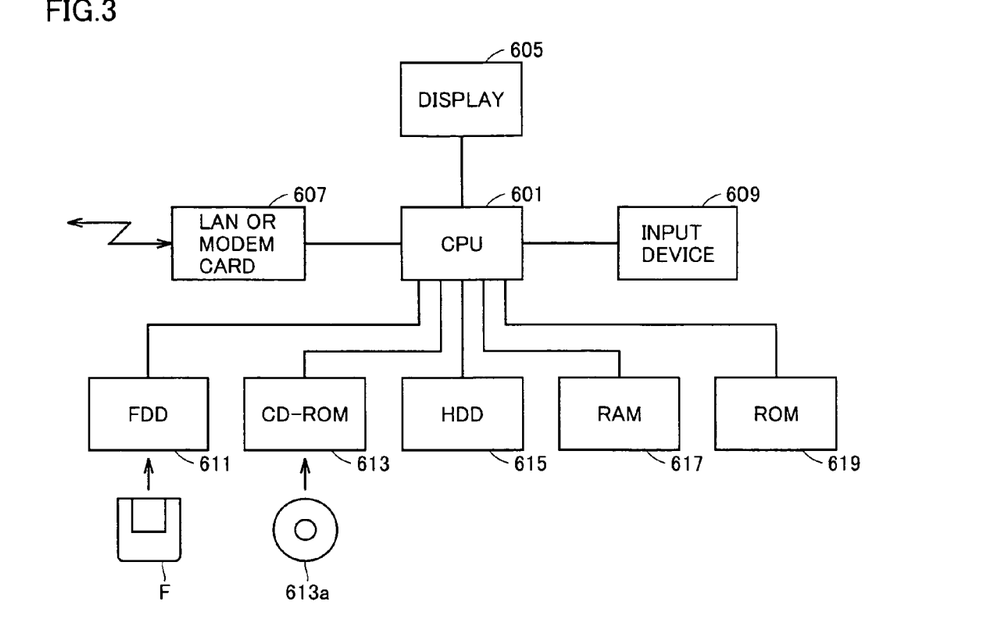
FIG. 3 is a block diagram showing a configuration in hardware of a client PC 6 of FIG. 1.

FIG. 3 is a block diagram showing a hardware configuration of client PC 6 shown in FIG. 1.

With reference to the figure, client PC 6 includes a CPU 601 generally controlling the device, a display 605, a local area network (LAN) card 607 (or a modem card) used to connect to a network, for external communications and the like, an input device 609 configured for example of a keyboard, a mouse and the like, a flexible disk drive 611, a CD-ROM drive 613, a hard disk drive 615, a RAM 617 and a ROM 619.

Flexible disk drive 611 allows reading data such as a program, an image and the like recorded on a flexible disk F, and CD-ROM drive 613 allows reading data such as a program, an image and the like recorded on a CD-ROM 613*a*.

In the present embodiment in image formation apparatuses 1-*n* at storage 104 a box is stored for each user and in the box a file or similar data are stored. When a user selects a box, a file or similar data a following operation procedure is narrowed down based on a record of how the box, the file or the like were previously used. More specifically, when the user selects a file that he/she desires to process first, its previously executed job/jobs is/are referred to to narrow down selectable jobs, specific settings, and the like.

Selectable jobs, specific settings, and the like are narrowed down with reference to a previous job history and analogy between files. For example a file analogous to a currently selected file is detected in a box and a job previously executed for the analogous file, a destination for transmission, and/or other similar specific settings are provided as a candidate for execution. Whether the currently selected file is analogous to a file is determined by whether their feature points (i.e., features of their file names, file types, images, and the like, as will be described hereinafter more specifically) match.

More specifically in the present embodiment an analogous file is a file having a matching feature point.

Thus in a method of operating a box of the image formation apparatus user operability can be enhanced.

To achieve the above function the image formation apparatus includes a function extracting a feature of a file, or a feature point, a function recording the feature point, a function displaying an operable option or the like, a function recording a history of a job, a local interface, and a network interface.

Figure 4:
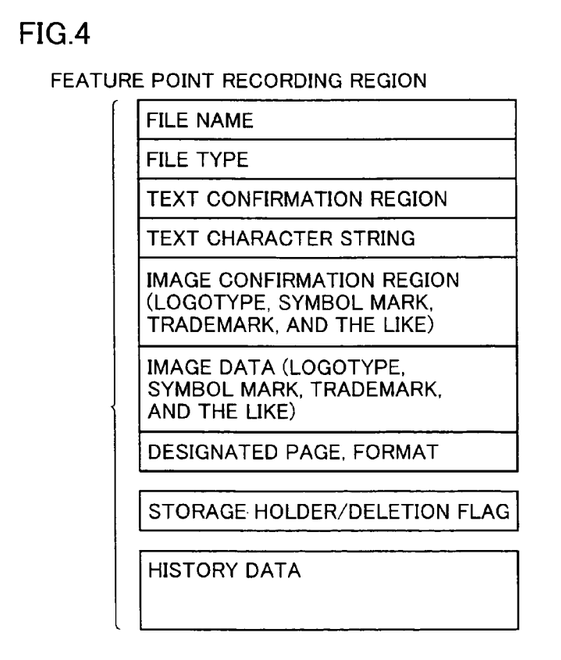
FIG. 4 shows a configuration of a feature point recording region stored in the image formation apparatus at a storage 104.

FIG. 4 shows a configuration of a feature point recording region stored in the image formation apparatus at storage 104.

With reference to the figure, the feature point recording region has recorded therein for each file a file name, a file type, a text confirmation region, a text character string, an image confirmation region (e.g., a logotype, a symbol mark, a trademark, and the like), a designated page and format, a storage holder, a deletion flag, and a file operation history data.

A document often has a title described therewith, and if the title is considered as a feature point it is effectively used in searching for an analogous file. Accordingly the title is adopted as one of feature points, and to do so, in the present embodiment the "text confirmation region" and the "text character string" are set as specific feature points. The former indicates a prescribed location at which the title is written and the latter indicates a character string described at the prescribed location. Note that the title may also include a creator of a document, the date of the creation of the document, a destination of the document, and the like.

Furthermore, a document often has a logotype, a symbol mark, a trademark or other similar image, and the like attached thereto, and considering such image as a feature point is also effective. Accordingly in the present embodiment the "image confirmation region" and the "image data" are set as specific feature points. The former indicates a prescribed location at which a logotype, a symbol mark, a trademark or other similar image is written and the latter indicates an image described at the prescribed location.

Furthermore the above described title, image (and furthermore, a format described hereinafter) and other similar feature points often exist in a document of a plurality of pages at a prescribed page (e.g., the first page), and setting as a feature point such a page having these feature points is also effective. Accordingly in the present embodiment a page having these feature points is adopted as a "designated page" to serve as a feature point.

Furthermore, among documents, there also is one employing a frame having a prescribed border drawn, and considering the frame as a feature point is also effective. In the present embodiment this frame is applied as a "format" to serve as a feature point.

Furthermore an analogous file is more likely to be present in the same box (or folder). Accordingly in the present embodiment a folder having a document stored therein is set as a "storage folder" to serve as a feature point.

Note that in FIG. 4 the "deletion flag" is a flag used to determine whether a currently processed file should be deleted after a series of operations completes.

Figure 5:
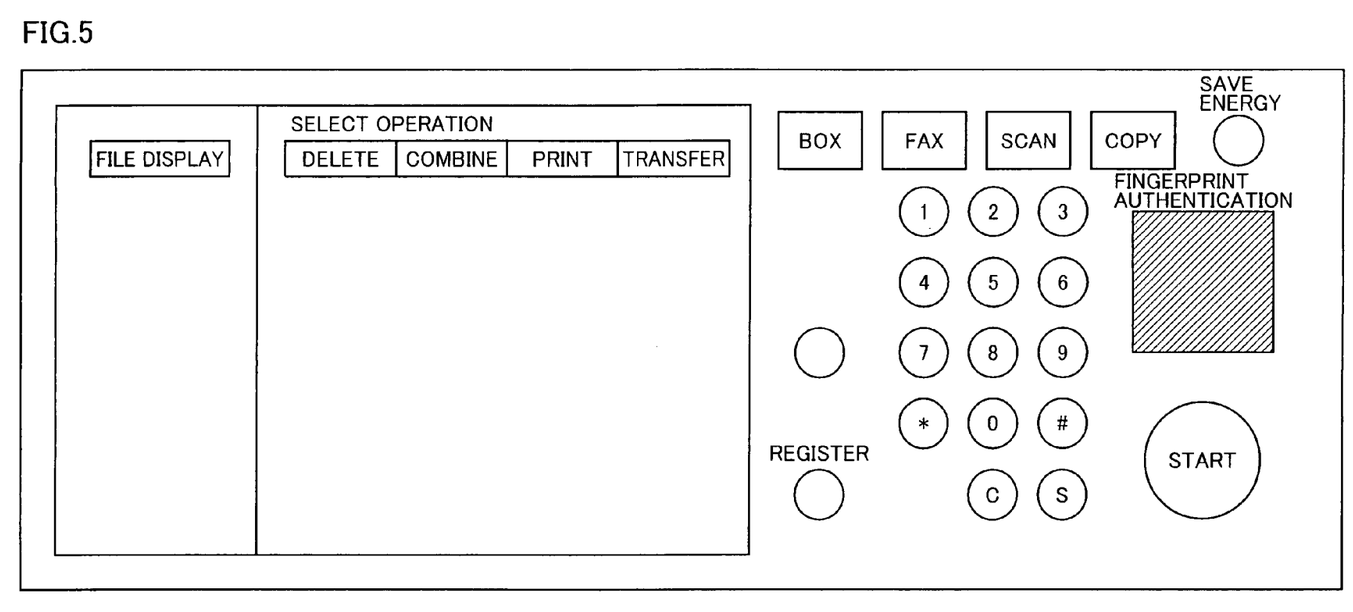
FIG. 5 is a plan view of a console 17 of the image formation apparatus on an initial screen.

FIG. 5 is a plan view of console 17 of the image formation apparatus on an initial screen.

Console 17 has a left half comprised of a liquid crystal display device and a touch panel stacked thereon, and a right half comprised of numeral keys, a box select key, a fingerprint authentication sensor, a start key and the like.

A user can press the box select key, or a file display key located on the liquid crystal display device to select a box registered with the image formation apparatus and furthermore select a file or similar data present in the box.

Figure 6:
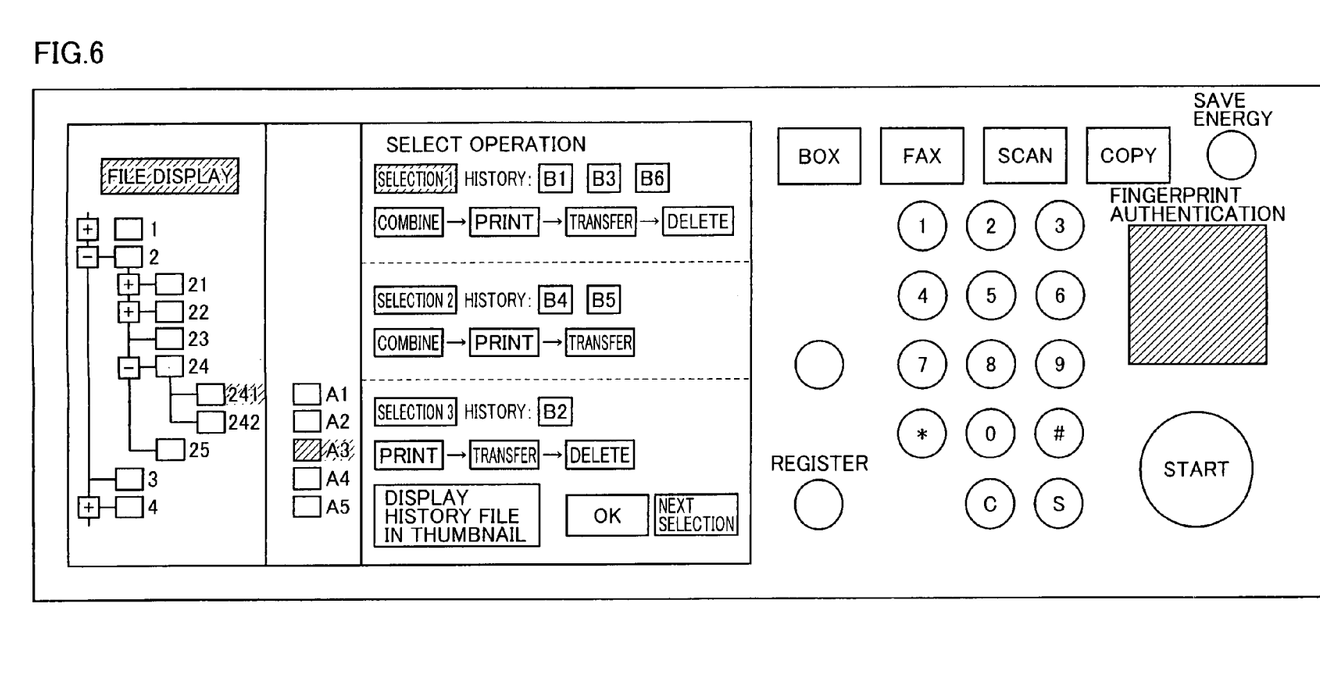
FIG. 6 shows a box and a file selected by a user in the condition shown in FIG. 5.

FIG. 6 shows a box and a file selected by a user in the condition shown in FIG. 5.

Herein among hieratically structured boxes a box 241 is selected and among files A1-A5 present therein a file A3 is selected for the sake of illustration.

Thus when file A3 is selected to undergo some process a feature point of file A3 is extracted. Subsequently, the feature point recording region of FIG. 4 is searched and files B1-*n* having a feature point matching that of file A3 are found and their history data are called. Note that files B1-*n* themselves may have been deleted. More specifically, rather than files B1-*n* themselves, feature point data and job history data associated therewith are called.

In the history data of files B1-*n* is stored a specific setting and procedure of one or more series of jobs previously executed. For example, the data has recorded therein a procedure of operating a series of jobs of combining with a designated file; thereafter performing double-sided printing; transmitting to a destination; and deleting source files B1-*n*.

To the user, jobs previously executed for files having a matching feature point are narrowed down and preferentially displayed. More specifically, from the history data of files B1-*n* candidate job procedures are displayed. From the candidates the user selects a desired job procedure. If the desired job procedure is not found an operation similar to a normal job selection is performed.

Note that "preferentially displayed" means that a job previously executed is displayed as a candidate job procedure to precede a job previously unexecuted. For example, the former job is indicated in a list at a higher place than the latter job.

FIG. 6 shows files B1-B5 extracted as those having a feature point matching that of file A3. Files B1, B3 and B6 have previously experienced a series of jobs "combine→print→transfer→delete" (a selection 1). Files B4 and B5 have experienced a series of jobs "combine→print→transfer" (a selection 2). Files B2 has previously experienced a series of jobs "print→transfer→delete" (a selection 3). The series of jobs are presented to the user for selection.

Note that "transfer (transmit)" is a job transmitting a file to an external. "Combine" is a job combining a file with another file. "Print" is a job printing a file's content. "Delete" is a job deleting a file.

Furthermore the user can select an indication of the liquid crystal display device to thumbnail and thus display a history file, display other option(s), manually select a job, and the like.

Furthermore if a selected series of jobs includes "transmit," "combine" and "print" jobs then the following process is effected. Note that herein the user has first selected a "file A" for the sake of illustration.

(1) If the subsequent job in the series of jobs is "transmit," a destination(s) to which a file B analogous to file A was previously transmitted as it was processed is/are displayed. The user thereby confirms the destination(s) to which the analogous file has previously been transmitted, and if the destination(s) include that to which the user desires to transmit file A, the user can readily transmit file A.

(2) If the subsequent job in the series of jobs is "combine," a file C previously combined in processing file B analogous to file A, and files D1-n analogous to file C are indicated as candidates for combination. Note that if three or more files are combined together this step is repeatedly performed.

Furthermore a candidate of a job ("transmit," "print" or the like) executed subsequent to "combine" may be indicated.

(3) If the subsequent job in the series of jobs is "print," a printing condition (such as double sided printing) previously adopted in processing file B analogous to file A is indicated as a candidate.

Note that if at the end of a series of jobs a "delete" job has been executed then "delete" is also a job candidate.

Figure 7:
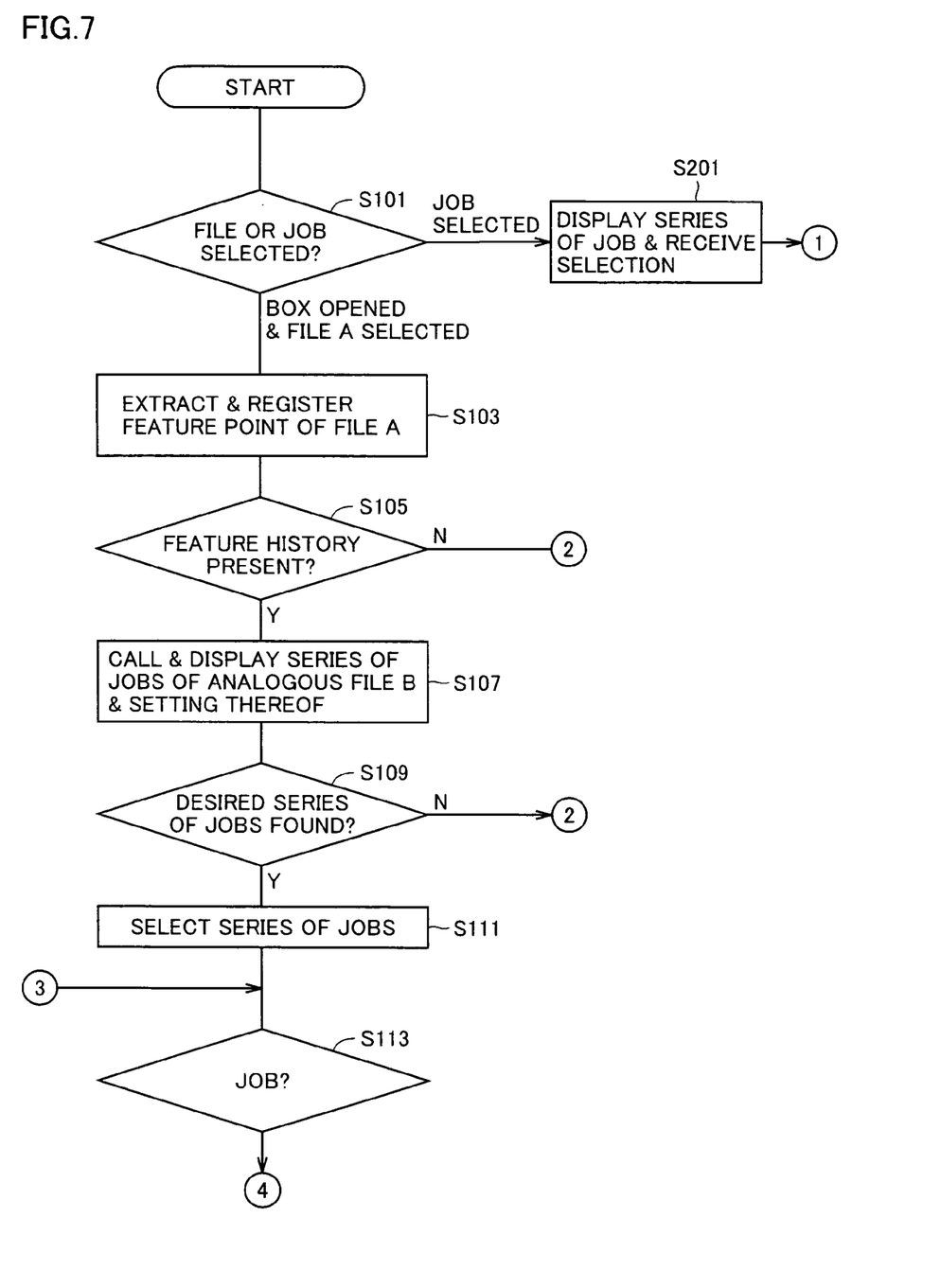
FIGS. 7 and 8 are a flowchart of a process executed by the image formation apparatus in the first embodiment.
Figure 8:
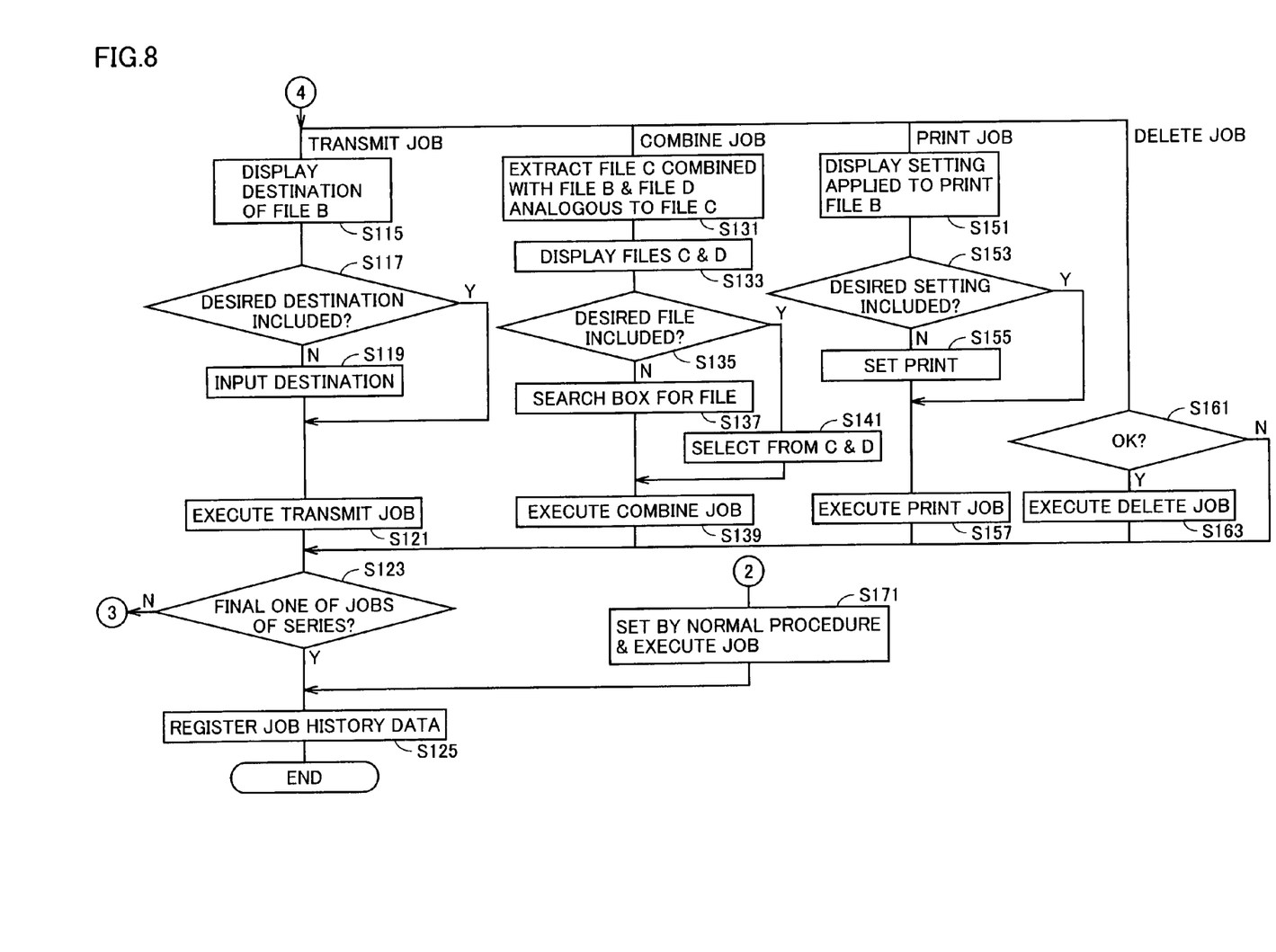

FIG. 7 is a flowchart of a process executed by the image formation apparatus in the first embodiment and FIG. 8 is that following thereto.

With reference to the figure, at step S101 a decision is made as to whether a file or a job has been selected. Herein a box is opened and file A has been selected for the sake of illustration. In that case, a decision that a file has been selected is made and the process proceeds to step S103 to extract and resister a feature point of file A.

At step S105 whether a feature history is recorded is searched for and if so the process proceeds to step S107 to call and display a set(s) of jobs, or (a) series of jobs, previously executed for file B analogous to file A, and a setting(s) adopted in executing the jobs.

At step S109 whether the user's desired series of jobs is included is determined from an input entered by the user, and if so the process proceeds to step S111 to set the user's selected series of jobs as that to be executed.

At step S113 a decision is made as to whether what in the selected series of jobs is a job to subsequently be executed.

If it is a "transmit" job, the process proceeds to step S115 to display a destination(s) to which file B was previously transmitted as it was processed.

At step S117 whether the user's desired destination included is determined from an input entered by the user and if so the process proceeds to step S121 to set the user's selected destination as that of the job executed and execute the "transmit" job. Otherwise the process proceeds to step S119 to receive an input of a destination from the user and proceeds to step S121.

If the job to subsequently be executed is a "combine" job, the process proceeds to step S131 to extract file C combined previously in processing file B and a file D analogous to file C and proceeds to step S133 to display the extracted files. Note that more than one file C and more than one file D may be extracted.

At step S135 whether a file desired by the user is included is determined from an input entered by the user and if so the process proceeds to step S141 to accept a file selected from the displayed files to be combined. At step S139 the selected file is set as a file for which the job is executed (i.e., as a file to be combined) and the "combine" job is executed. Otherwise the process proceeds to step S137 to receive an input from the user indicating a file to be combined, and proceeds to step S139.

If the job to subsequently be executed is a "print" job, the process proceeds to step S151 to display a setting adopted previously in processing file B to print it.

At step S153 whether a setting desired by the user is included is determined from an input entered by the user and if so the process proceeds to step S157 to apply the setting to execute the print job. Otherwise the process proceeds to step S155 to receive a setting input by the user for printing, and proceeds to step S157.

If the job to subsequently be executed is a "delete" job, the process proceeds to step S161 to receive an input from the user indicating an OK or not and if the input indicates OK the process proceeds to step S163 to execute the delete job.

After each job is processed the process proceeds to step S123 to determine whether the final one of the jobs of the series has completely been executed and if so the process proceeds to step S125 to correlate job history data with file A for registration. Otherwise the process returns to step S113 to execute a subsequent job.

For No at S105 or No at S109 the process proceeds to step S171 to provide a setting in a normal procedure and execute a job.

Thus when a file is selected a job previously executed for a file analogues thereto is read. A user makes a selection and subsequently a job is executed. An image formation apparatus capable of facilitating user operation can thus be provided.

Second Embodiment

The present invention in a second embodiment provides an image formation apparatus as described hereinafter.

In the present embodiment a user first selects a job to be executed. In response, candidate files and specific settings are narrowed down. More specifically, when a job to be executed is selected by the user a history is then referenced to display a plurality of series of jobs previously executed with that job at the top. If a series of jobs is selected by the user, files E1-m having a history of executing the job and files F1-n analogous to files E1-m are narrowed down and preferentially displayed.

If the selected series of jobs includes transmit, combine and print jobs the following process is effected.

(1) If the "transmit" job is executed:

(1-1) If "a destination for distribution" is subsequently selected, files E1-m previously transmitted to the destination and files F1-n analogous to files E1-m are preferentially displayed. Furthermore, if there is a broadcast destination, and the user enters an additional destination for distribution, files displayed are further narrowed down. Based on what is displayed the user selects a file to be transmitted.

(1-2) If the "transmit" job is selected and thereafter a file is selected, a destination(s) to which the selected files E1-$m$ were previously transmitted and that/those to which files F1-$n$ analogous to files F1-$m$ are displayed. If the displayed destinations include a desired destination for distribution the user selects it. Otherwise the user inputs a new destination. Note that an "analogous file" is a file having a matching feature point, or the like.

Figure 9:
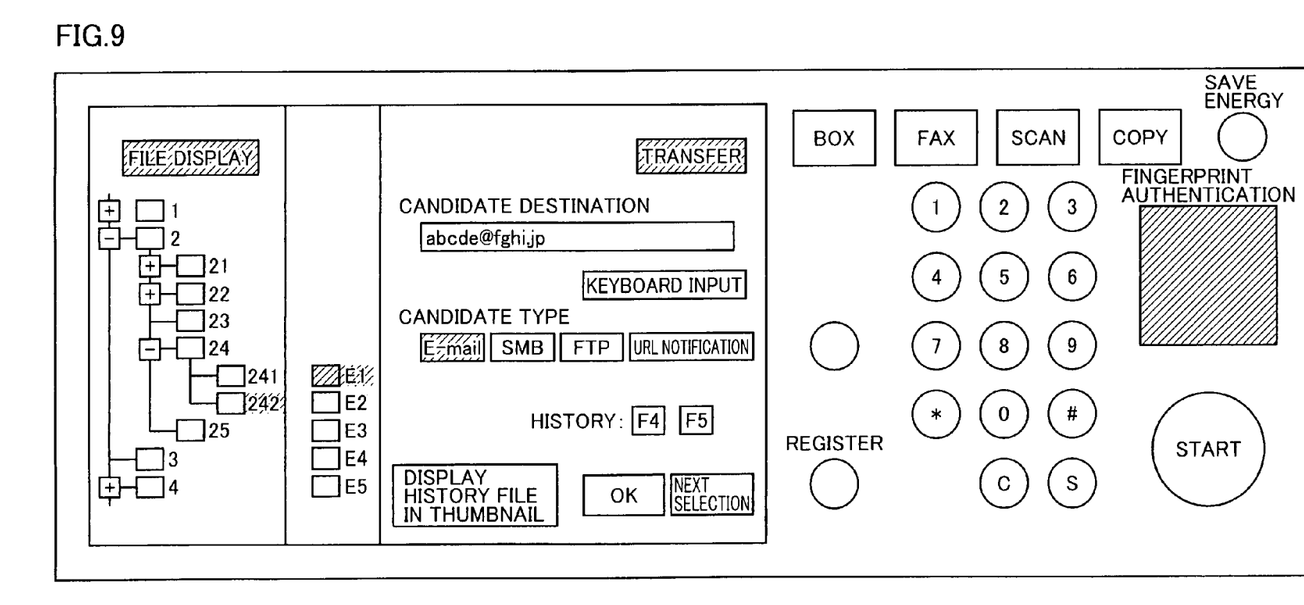
FIG. 9 shows that that a transmit job is to be executed is input by a user in the condition of FIG. 5 and a file E1 is selected as a file to be transmitted.

FIG. 9 shows that that a transmit job is to be executed is input by a user in the condition of FIG. 5 and file E1 is selected as a file to be transmitted.

As shown in the figure, files F4 and F5 analogous to file E1 are extracted and a destination(s) to which the files were previously transmitted is/are displayed as a candidate(s). Furthermore, herein, any candidate transmission systems are also searched for from a previous history and the user is urged to select a transmission system therefrom.

(2) If the "combine" job is executed, the leading files E1-$m$ having previously been combined, and files F1-$n$ analogous thereto are preferentially displayed. If the leading file is selected by the user, a file G having previously been combined thereto, and files H1-$n$ analogous thereto are displayed as candidates to be combined. If three or more files are combined, such selection process is repeatedly performed.

(3) If the "print" job is executed, and a file (herein, file E for the sake of illustration) is selected, a printing condition (e.g., double sided printing) having been applied for file F analogous to file E is displayed and the user's selection is accepted.

Figure 10:
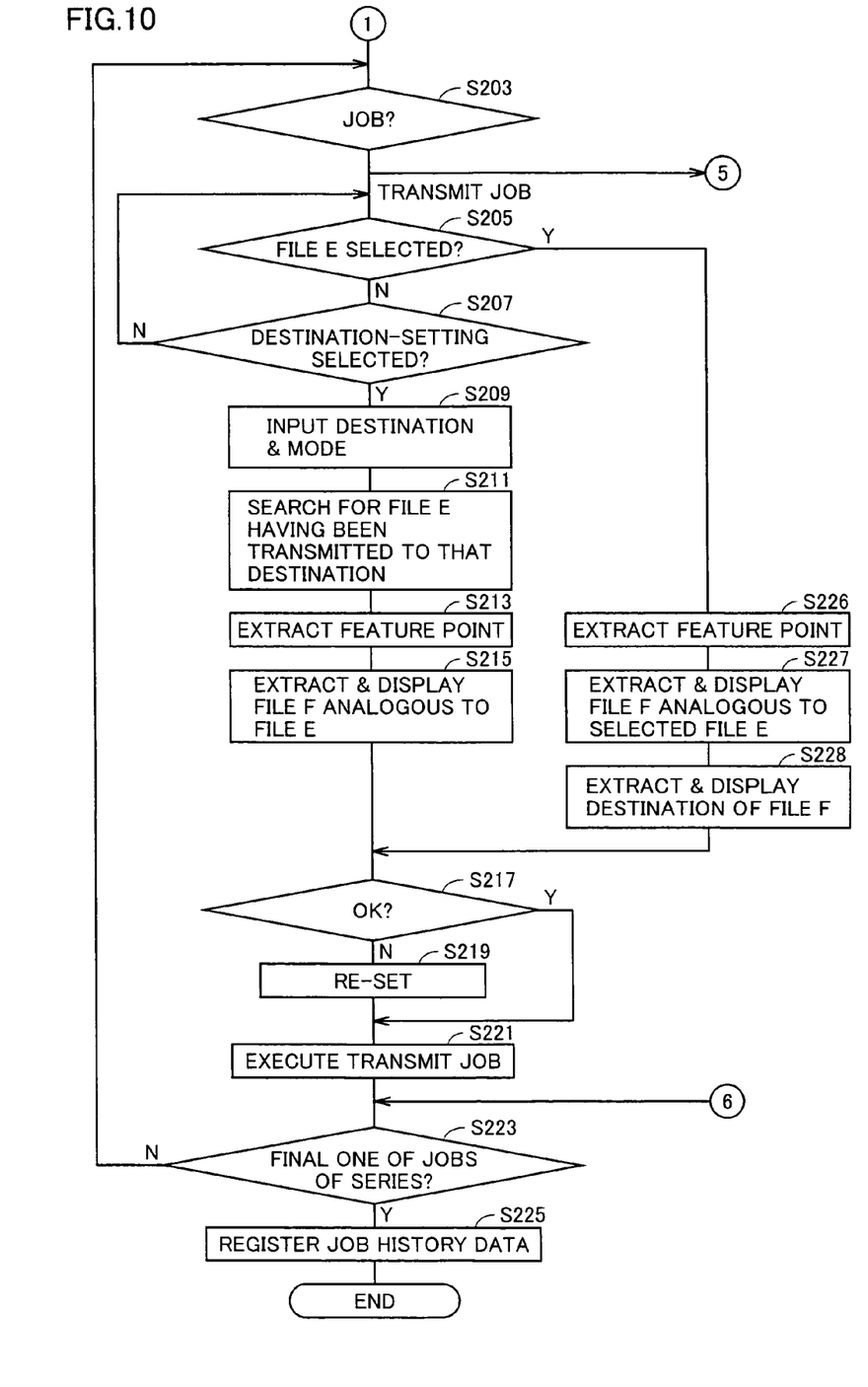
FIGS. 10 and 11 are a flowchart of a process executed by the image formation apparatus in a second embodiment.
Figure 11:
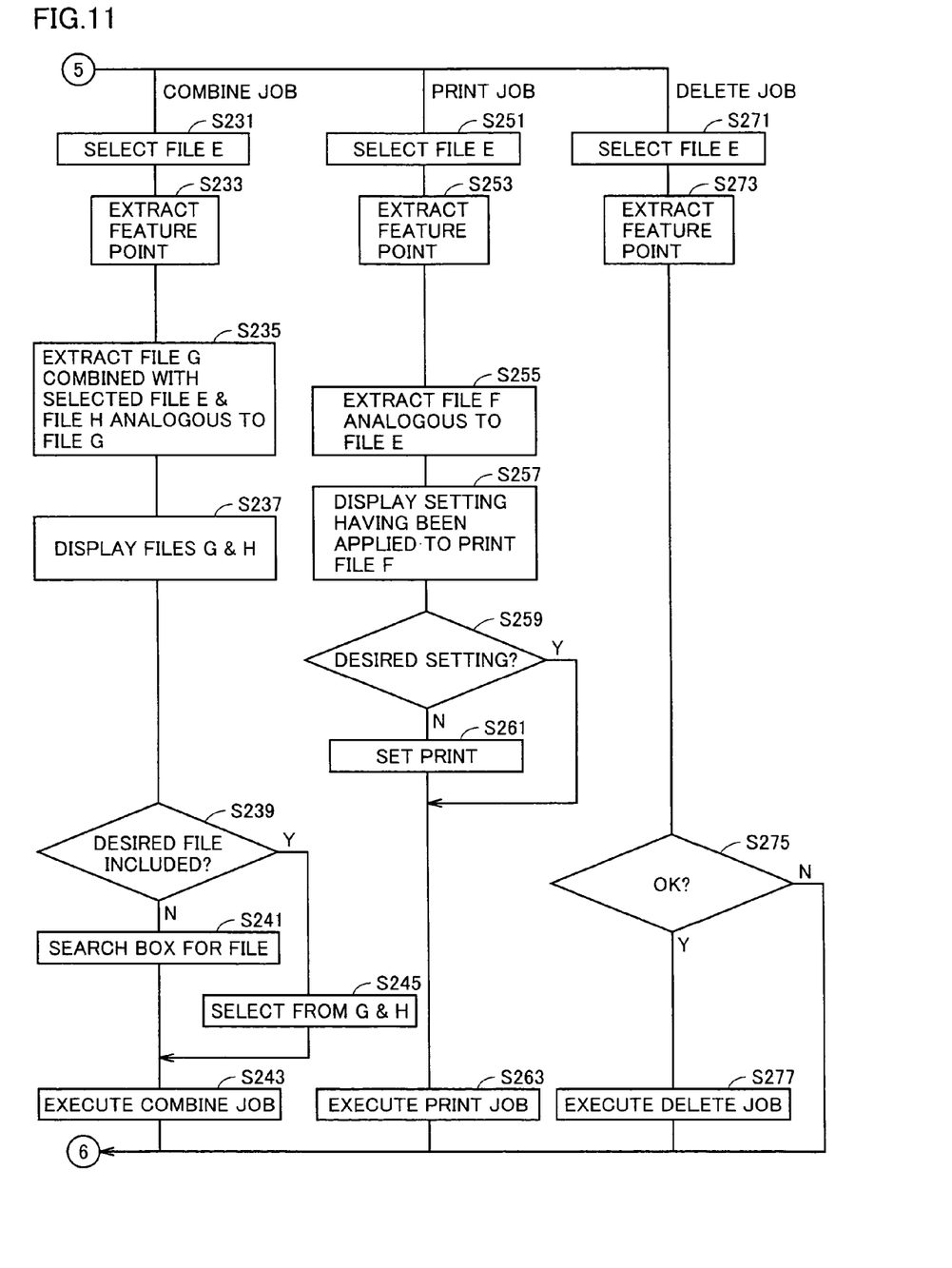

FIG. 10 is a flowchart of a process executed by the image formation apparatus in the second embodiment and FIG. 11 is that following thereto:

The flowchart of FIG. 10 indicates a process performed after a job is selected in step S101 indicated in FIG. 7.

In FIG. 7 at step S101 when a job is selected the process proceeds to step S201 to display a series of jobs previously executed with that selected job at the top, and receive an input from the user indicating the user's selection.

At step S203 a job in a series of jobs that is executed is determined.

If the determined job is a "transmit" job the process proceeds to step S205 to determine whether a file has been selected. (If so the selected file will be referred to "file E.") If so the process proceeds to step S226 to extract a feature point of file E and proceeds to step S227 to extract and display file F analogous to file E. The process proceeds to step S228 to retrieve and display any destinations to which file F was previously transmitted, and receive a selection from the user.

At step S217 whether a selection is received from the user and if so the process proceeds to step S221 to transmit file E to the selected destination to execute the transmit job.

If at step S217 the user's desired destination is not presented the process proceeds to step S219 to re-set a destination.

For No at step S205 the process proceeds to step S207 to determine whether setting a destination has been selected and if so the process proceeds to step S209 and a destination and a transmission mode are received from the user. The process proceeds to step S211 to search for any files (herein referred to as "file E") previously transmitted to the received destination and proceeds to step S213 to extract a feature point of file E.

At step S215 file F analogous to file E is extracted and displayed to the user. Thereafter in step S217 and the following process a process is performed to cause a user to select a file to be transmitted.

If the job in the series of jobs that is executed is a "combine" job the process proceeds to step S231 to receive a file selected from a file previously combined and a file analogous thereto. Note that the selected file will be referred to as "file E" for the sake of illustration.

At step S233 a feature point of file E is extracted and at step S235 file G previously combined with the selected file E and a file H analogous to file G are extracted and displayed at step S237.

At step S239 whether a desired file is included is determined from the user's input and if so the process proceeds to step S245 to receive from the user a file selected to be combined. Thereafter at step S243 the combine job is executed.

For No at step S239 the process proceeds to step S241 to urge the user to select from a box a file to be combined, and proceeds to step S243.

If the job in the series of jobs that is executed is a "print" job the process proceeds to step S251 to receive a file selected Note that the selected file will be referred to as "file E" for the sake of illustration.

At step S253 a feature point of file E is extracted and at step S255 file F analogous to file E are extracted and at step S257 a setting adopted when file F was printed is displayed.

At step S259 whether it is a desired setting is determined from the user's input and if so the process proceeds to step S263 to execute the print job.

For No at step S259 the process proceeds to step S261 to urge the user to input a setting for printing, and proceeds to step S263.

If the job in the series of jobs that is executed is a "delete" job the process proceeds to step S271 to receive a file selected. Note that the selected file will be referred to as "file E" for the sake of illustration.

At step S273 a feature point of file E is extracted and at step S275 whether it is OK or not is determined from the user's input and if so the process proceeds to step S277 to execute the delete job.

After each job is processed the process proceeds to step S223 to determine whether the final one of the jobs of the series has completely been executed and if so the process proceeds to step S225 to correlate job history data with file E for registration. Otherwise the process returns to step S203 to execute a subsequent job.

Figure 12:
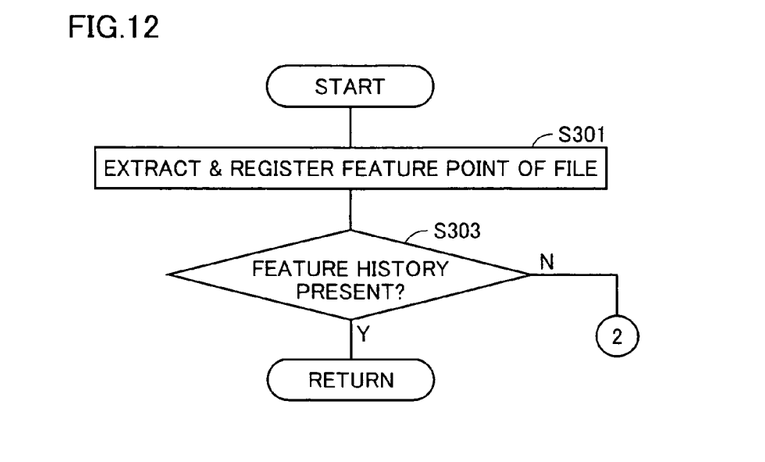
FIG. 12 is a flowchart specifically describing the feature point extraction process of FIGS. 10 and 11 (S213, S226, S233, S253, S273).

FIG. 12 is a flowchart specifically describing the feature point extraction process of FIGS. 10 and 11 (S213, S226, S233, S253, S273).

With reference to the figure at step S301 a feature point of a file is extracted and registered. At step S303 whether a feature history exists is determined and if so the process returns to a main routine, otherwise the process proceeds to step S171 (FIG. 8).

Third Embodiment

A third embodiment provides an image formation apparatus identical in configuration to that shown in FIG. 1. In the present embodiment a client PC and an image formation apparatus have their respective histories integrated together to narrow down an operation of the apparatus.

A user operates the client PC to log in the image formation apparatus by clicking an icon of the apparatus displayed on a screen, pressing a right button of a mouse of the client PC to select an image formation apparatus to be operated, or the like. By logging in the image formation apparatus, execution history data of the image formation apparatus alone and history data of operating the image formation apparatus from the client PC are called.

Figure 13:
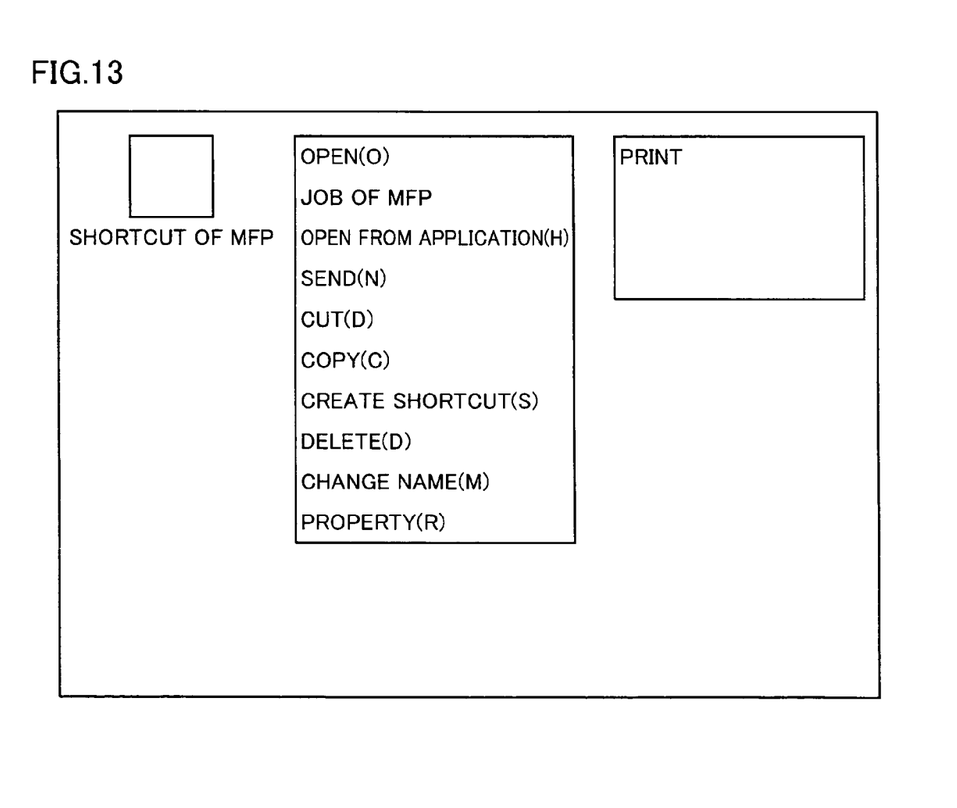
FIG. 13 shows a screen employed to log in the image formation apparatus from the client PC.

FIG. 13 shows a screen employed to log in the image formation apparatus from the client PC.

With reference to the figure, when a user clicks an icon of the image formation apparatus (or MFP) displayed on the screen, a screen for selecting an operation subsequently executed is displayed to receive an input from the user indicating a job selected to be executed or a file selected to be processed.

Depending on how the client PC is operated, the following processes are performed.

(1) Operating the Client PC to Fist Select a File

When the client PC is operated to select a file (herein referred to a "file J") to be processed from a box of the image formation apparatus or a folder of the client PC, a file K analogous to file J is selected from box of the image formation apparatus and folder of the client PC. As based on history data of the client PC and that of the image formation apparatus integrated together, series of jobs executed for file K are narrowed down and displayed on a screen of the client PC.

Thereafter, specific settings for the job are narrowed down, as described in the first embodiment.

(2) Operating the Client PC to First Select a Job

When the client PC is operated to select a job of the image formation apparatus, the history data of the client PC and that of the image formation apparatus combined together are referred to to display any series of jobs previously executed with the selected job at the top. If the user selects a series of jobs therefrom, files L1-$m$ having a history of having executed the job and files M1-$n$ analogous to files L1-$m$ are narrowed down and preferentially displayed.

Thereafter, the files and the jobs are narrowed down, as described in the second embodiment.

Fourth Embodiment

A fourth embodiment provides an image formation system identical to that shown in FIG. 1. In the present embodiment the image formation apparatus is configured so that a function of a client PC can be used to execute a job of the apparatus.

More specifically, in executing a job of the image formation apparatus, application software of the client PC can be used for example in printing an application file of the client PC when the client PC has an application initiated and a file is opened and printed, or after the image formation apparatus has a document scanned when the client PC's optical character reader (OCR) application is utilized, or the like.

When the image formation apparatus is operated to operate an application of the client PC or the client PC has the application opened and a job of the image formation apparatus is operated, the fact that the application of the client PC has been opened is registered in history data. The history data is used to narrow down analogous files and jobs executed for the files. Furthermore, when a job is selected, files having previously experienced the job and files analogous thereto are narrowed down.

Figure 14:
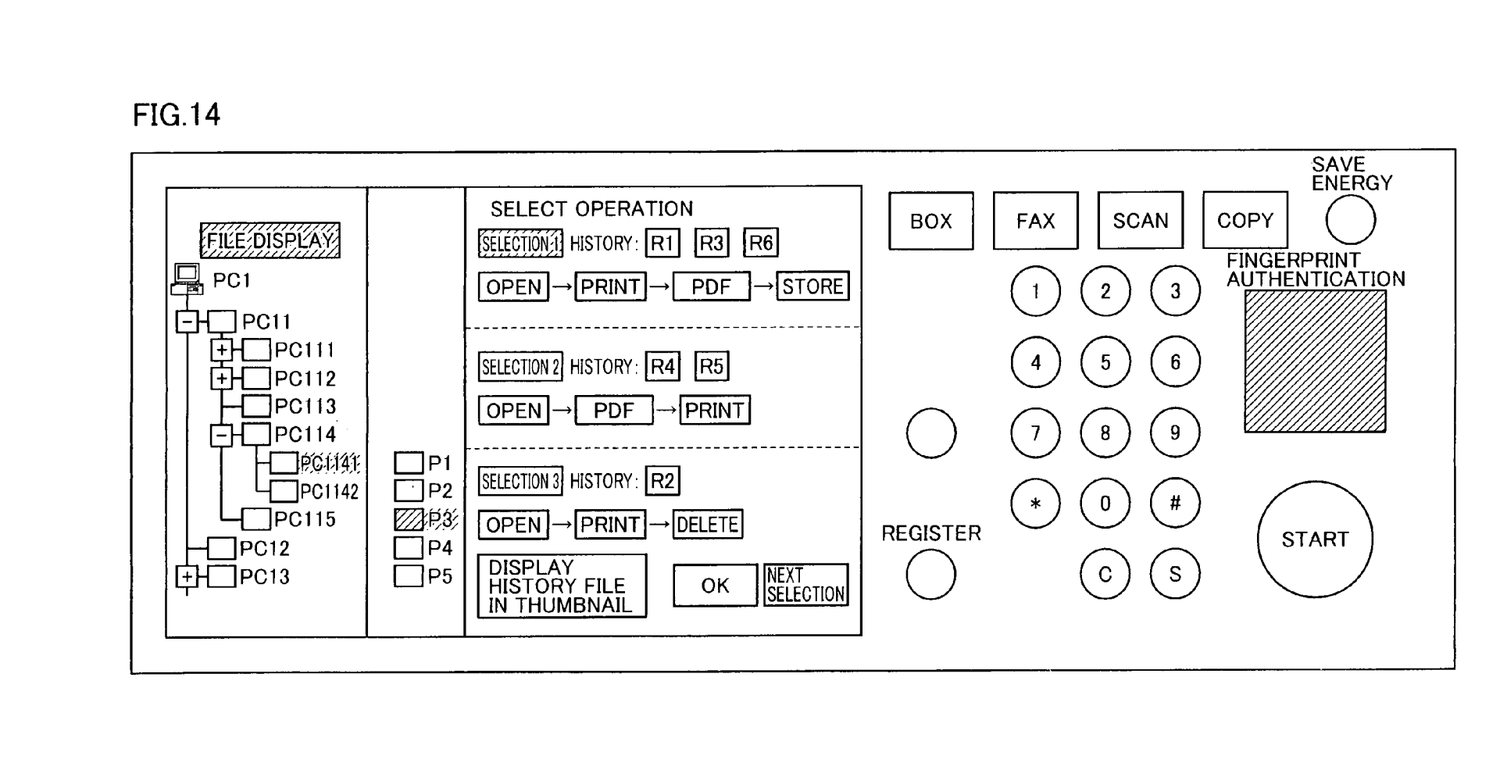
FIG. 14 shows that a file of the client PC is selected via the console of the image formation apparatus.

FIG. 14 shows that a file of the client PC is selected via the console of the image formation apparatus.

With reference to the figure, the client PC has a hard disk with a box (or folder) recorded therein, and therefrom a folder "PC1141" is selected and in that selected folder a file P3 is selected as a file to be processed for the sake of illustration.

Herein as files analogous to file P3 files R1-R6 are selected and series of jobs previously executed for these files are retrieved. The user can select his/her desired series of jobs to execute that series of jobs. Herein, "PDFing" in a series of jobs is a process executed by initiating the application of the client PC.

Effects of Embodiments

Thus in the present invention as described in embodiments a user can perform a single operation (selecting a job, selecting a file, and the like) to narrow down options in a following procedure. If the number of options is increased the user can be free from cumbersome operation. Furthermore, the user's erroneous operation can also be prevented.

Furthermore when a file identical in type to that previously operated is operated, a job having a highest possibility of execution is preferentially displayed. The user's operation can be simplified.

In contrast, when a job to be executed is first selected, a file having a highest possibility of execution is preferentially displayed. This enables the user to save time and effort to select a file.

For a distribution job, in particular, destinations are listed, as limited, and displayed. This contributes to reduced erroneous setting. Furthermore, increasing the precision applied in extracting a feature point can eliminate the necessity of the user selecting a destination.

Others

If in the first embodiment more than one file is selected, jobs may be narrowed down as based on a combination of the selected jobs.

Furthermore if a box is selected and a file therein or a job to be executed is selected an analogous file may be extracted only from those in the selected box or may be extracted among all files in the apparatus. Furthermore, the analogous file may be extracted only from the box and a common box.

Furthermore if a file is selected, only execution history of a file analogous thereto may be subject to selection by the user or that of the selected file itself may also be included to be subject to selection by the user.

Furthermore, retrieved execution histories alone may be displayed in a list and therefrom the user's selection may be received or an operation that is not hit in a search may be included in the list and therefrom the user's selection may be received.

Furthermore, a file having a feature point matching that of a selected file may be defined as an "analogous file" and the selected file itself may also be included as an "analogous file" as the selected file of course has a matching feature point.

Furthermore the present invention is applicable not only to the image formation apparatus and the client PC but any equipment allowing a file to be operated, such as mobile terminals, mobile phones and similar equipment.

Furthermore the process described in the above embodiments may be performed by software or using a hardware circuit.

Furthermore, a program executing the process described in the embodiments can also be provided, and the program may be stored in a CD-ROM, a flexible disk, a hard disk, a ROM, a RAM, a memory card, or a similar storage medium and thus provided to users. Furthermore, the program may be downloaded to the apparatus via the Internet or a similar communications line.

Furthermore the present invention is also applicable to a networked system as well as a system that is not connected to a networked environment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A file processing apparatus comprising:
a first recorder recording a feature of each file;
a second recorder recording an execution history of each operation job;

a receiver configured to receive an input indicative of an operation job to be executed, wherein a file of the operation job to be executed is not specified;

a searcher configured to search content of the second recorder to identify an executed file, wherein an operation job of the executed file is similar to the operation job to be executed;

an extractor configured to extract a feature of the executed file identified by the searcher, wherein the searcher is further configured to search content of the first recorder to identify an analogous file by determining that the analogous file has a feature that matches the extracted feature of the executed file;

a retriever configured to retrieve said analogous file; and a microprocessor configured to execute the operation job to be executed for the retrieved analogous file, wherein the input indicative of the operation job to be executed includes an input indicative of a box selected and an input indicative of a file present in the selected box.

2. The file processing apparatus according to claim 1, wherein the searcher searches for a file present in the selected box.

3. The file processing apparatus according to claim 1, wherein when an image formation apparatus is operated from a client PC the searcher also searches for a file present in the client PC and an execution history of the file present in the client PC.

4. The file processing apparatus according to claim 1, wherein when a client PC has an application operated from an image formation apparatus the searcher also searches for a file present in the client PC and an execution history of the file present in the client PC.

5. The file processing apparatus according to claim 1, wherein after a file is deleted a feature and execution history thereof are still held.

6. A method of processing a file, comprising the steps of:
recording a feature of each file in a first recorder;
recording an execution history of each operation job in a second recorder;
receiving an input indicative of operation job to be executed, wherein a file of the operation job to be executed is not specified;
searching content of the second recorder to identify an executed file, wherein an operation job of the executed file is similar to the operation job to be executed;
extracting a feature of the identified executed file;
searching content of the first recorder to identify an analogous file by determining that the analogous file has a feature that matches the extracted feature of the executed file;
retrieving the analogous file; and
executing the operation job to be executed for the retrieved analogous file using a microprocessor, wherein
the input indicative of the operation job to be executed includes an input indicative of a box selected and an input indicative of a file present in the selected box.

7. The method according to claim 6, wherein the step of searching searches for a file present in the selected box.

8. The method according to claim 6, wherein when an image formation apparatus is operated from a client PC a file present in the client PC and an execution history of the file present in the client PC are also searched for.

9. The method according to claim 6, wherein when a client PC has an application operated from an image formation apparatus a file present in the client PC and an execution history of the file present in the client PC are also searched for.

10. The method according to claim 6, wherein after a file is deleted a feature and execution history thereof are still held.

11. A file processing program product embedded on a non-transitory computer readable storage medium causing a computer to execute the steps of:
recording a feature of each file in a first recorder;
recording an execution history of each operation job in a second recorder;
receiving an input indicative of operation job to be executed, wherein a file of the operation job to be executed is not specified;
searching content of the second recorder to identify an executed file, wherein an operation job of the executed file is similar to the operation job to be executed;
extracting a feature of the identified executed file;
searching content of the first recorder to identify an analogous file by determining that the analogous file has a feature that matches the extracted feature of the executed file;
retrieving the analogous file; and
executing the operation job to be executed for the retrieved analogous file using a microprocessor, wherein
the input indicative of the operation job to be executed includes an input indicative of a box selected and an input indicative of a file present in the selected box.

* * * * *